A. DODGE.
Grain-Drill.
No. 53,960. Patented Apr. 17, 1866.
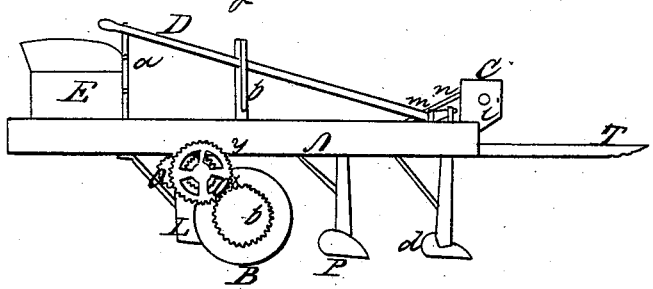
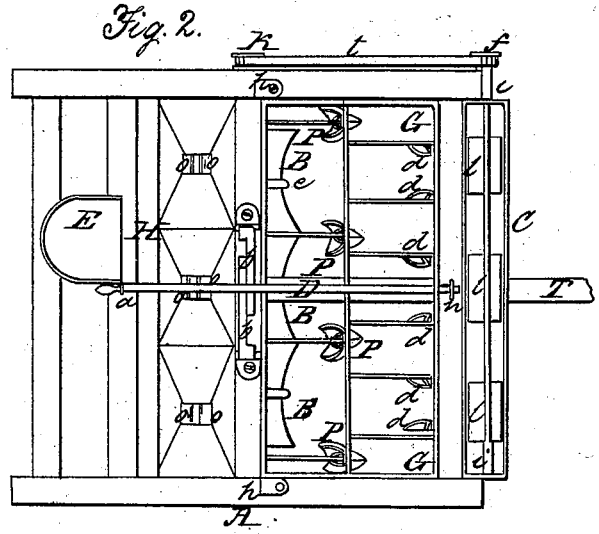
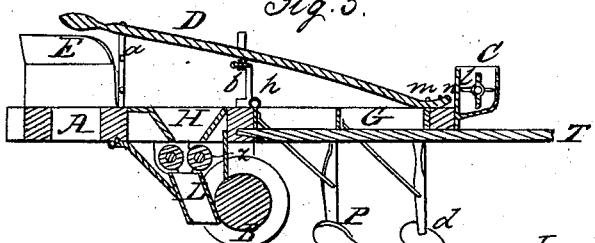
Witnesses:
R. Brunbeck
P. T. Dodge
Inventor:
Allen Dodge
By his atty
W. C. Dodge

UNITED STATES PATENT OFFICE.

ALLEN DODGE, OF GEORGETOWN, DISTRICT OF COLUMBIA.

IMPROVEMENT IN COMBINED CULTIVATOR AND SEEDING MACHINE.

Specification forming part of Letters Patent No. 53,960, dated April 17, 1866.

*To all whom it may concern:*

Be it known that I, ALLEN DODGE, of Georgetown, in the District of Columbia, have invented certain new and useful Improvements in Cultivating and Planting Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a side elevation; Fig. 2, a top plan view; Fig. 3, a longitudinal vertical section, and Fig. 4 a view of one of the rollers detached.

The nature of my invention consists in constructing a machine having a series of plows mounted in an adjustable frame and arranged to throw the land into ridges, and followed by rollers of novel construction for smoothing and shaping the ridge and forming a furrow thereon for receiving the seed, in combination with an apparatus for planting the seed and distributing a fertilizer at the same time.

A represents the main frame, which may be of any required form and size, in this case being of rectangular shape, and provided with a tongue, T, as shown. About midway of the frame A, underneath it, is mounted a shaft, $r$, having secured upon it three rollers, B, as shown in Fig. 1, the form of these rollers being clearly shown in Fig. 4.

G represents a strong frame, of proper size to fit within the front part of the frame A, hinged to the latter at $h$ on each side, as shown in Fig. 2. This inner frame, G, has secured to its front part a series of plows, $d$, arranged in pairs of two each, to turn the soil inward toward each other, there being six of these plows—two for each of the rollers B. Immediately in the rear of the plows $d$ is secured, in like manner, to frame G another set of double mold-board plows, P, these latter being arranged to turn their furrows in the same direction as those turned by the plows $d$. It will thus be seen that the entire space passed over by the machine will be plowed, and that by the peculiar arrangement of the plows the earth will be formed into three parallel ridges.

The rollers B are formed as shown in Fig. 4, being concave longitudinally, and having a circumferential projection, $e$, at their center. These rollers, following immediately in the rear of the plows, serve to crush any clods that may exist, and at the same time round over the surface of the ridges thrown up by the plows, the projection $e$ forming a continuous depression or small furrow for receiving the seed on the top and at the center of each ridge.

Directly in rear of the rollers B a seed-hopper, H, is located, having tubes L leading from it down to each of the seed-furrows. Underneath the hopper is mounted two parallel shafts provided with seed-rollers, $o$, made preferably of rubber, and so geared as to revolve toward each other, and thus feed the seed from the hopper into the furrow on the top of each ridge. These seed-rollers have motion communicated to them by means of the gear-wheels $p\ y$ and $o^*\ o^*$, arranged as shown in Fig. 1, or by any similar means.

Upon the front portion of the frame A is located another hopper, C, for the distribution of guano, lime, or any similar fertilizer, the openings in this hopper being arranged to deliver the fertilizer at the central portion of the ridges, or evenly over the entire surface, as may be desired, to suit the varying conditions of the soil and the kind of crop to be planted.

A shaft, $i$, having wings or stirrers $l$, for stirring up and feeding out the fertilizer, is located in the hopper, as shown in the drawings, and on one end of this shaft is secured a pulley, $f$, from which a belt, $t$, passes to a pulley, $k$, on the shaft that supports the rollers B.

E represents a seat for the operator, mounted on the rear end of the main frame A.

D represent a lever, having its fulcrum on the hinged supports $b$, its front end passing through an eye, $m$, secured to the front portion of the plow-frame G, and also through another eye or staple, $n$, secured to the front cross-bar of frame A, the rear end of this lever D extending back by the side of the seat E, where it is secured by projections on the side of post $a$. By this arrangement of the lever it will be seen that it serves to lock the frame G securely in place when the plows are down, and when drawn back out of the staple $n$ it can be used to elevate the frame G with its plows and hold them up, as will be necessary when turning about or in traveling to and from the field.

In order to prevent the rollers from becoming clogged by the adhesion thereto of the soil, a scraper, $z$, (shown in section in Fig. 3,) of a shape corresponding to the outlines of the roller B, is located so as to scrape the soil from each roller as it revolves.

It will, of course, be understood that the machines may be made of any desired size, and that the number of plows and rollers may be varied at will to suit circumstances. It will also be understood that the gearing will be so arranged that it can be thrown in or out of gear to operate the seeding mechanism when desired, as is usual in seeding-machines.

This machine is more especially designed for cultivating cotton, tobacco, and similar crops, but may also be used for corn. By making the rollers shorter and increasing their number it may also be used as a drill for wheat, oats, rye, and similar small grains. By elevating or depressing the plows it may also be used for marking the ground into check-rows by passing it in both directions over the surface. It also forms a very useful implement for fall-plowing, it leaving the soil thrown up into ridges in the best form for receiving the full benefit of the disintegrating effects of the frost. By its use, also, crops of spring wheat, oats, &c., may be planted at one operation as soon as the frost is out of the ground, especially on lands plowed in the fall.

When used for planting cotton-seed the hopper should have vertical sides to prevent the seed from becoming clogged, and a shaft provided with suitable arms should also be located in the seed-hopper for the purpose of keeping the seed loose, so as to be fed out with regularity. By these means I am enabled to produce an implement adapted to the tilling of the soil and the planting of crops of nearly all kinds.

Having thus fully described my invention, what I claim is—

1. The combination and arrangement of the single plows $a$ with the double plows P, as shown and described, for the purpose of forming the ridges to receive the seed, as set forth.

2. The rollers B, constructed and arranged to operate in combination with the plows, substantially as shown and described.

3. Attaching the plows to the frame G, hinged at its rear side, and provided with the lever D, arranged to operate as set forth.

4. In combination with the series of plows and rollers B, the seed-hopper H, arranged to deliver the seed to the furrows formed by the projections $e$, as herein described.

5. A machine having the series of plows, the rollers B, the seeding devices, and fertilizer-distributer, combined and arranged for joint action substantially as herein shown and described.

ALLEN DODGE.

Witnesses:
H. C. DODGE,
R. E. RUERBECK.